United States Patent
Gomez-Collazo et al.

(10) Patent No.: US 9,393,897 B2
(45) Date of Patent: Jul. 19, 2016

(54) SYSTEM AND METHOD FOR NOTIFYING THE PRESENCE OF AN UNATTENDED CHILD

(71) Applicant: Momentum Creative Labs LLC, Mayagüez, PR (US)

(72) Inventors: Mark J. Gomez-Collazo, San German, PR (US); Victor L. Hernandez Santiago, Aguadilla, PR (US); Diego A. Aponte Roa, Guaynabo, PR (US)

(*) Notice: Subject to any disclaimer, the term of this patent is extended or adjusted under 35 U.S.C. 154(b) by 0 days.

(21) Appl. No.: 14/478,590

(22) Filed: Sep. 5, 2014

(65) Prior Publication Data
US 2015/0130604 A1    May 14, 2015

Related U.S. Application Data

(60) Provisional application No. 61/903,590, filed on Nov. 13, 2013.

(51) Int. Cl.

| | |
|---|---|
| *B60Q 1/00* | (2006.01) |
| *B60Q 5/00* | (2006.01) |
| *G08B 13/14* | (2006.01) |
| *B60N 2/28* | (2006.01) |
| *G08B 21/02* | (2006.01) |
| *G08B 21/22* | (2006.01) |
| *B60N 2/00* | (2006.01) |
| *G08B 21/24* | (2006.01) |
| *B60N 2/26* | (2006.01) |

(52) U.S. Cl.
CPC *B60Q 1/00* (2013.01); *B60N 2/002* (2013.01); *B60N 2/26* (2013.01); *B60N 2/28* (2013.01); *B60N 2/2866* (2013.01); *B60Q 5/005* (2013.01); *G08B 13/1427* (2013.01); *G08B 21/0205* (2013.01); *G08B 21/22* (2013.01); *G08B 21/24* (2013.01)

(58) Field of Classification Search
CPC .... G08B 21/22; G08B 21/24; G08B 21/0205; G08B 13/1427; B60N 2/26; B60N 2/28; B60N 2/2866
USPC ......................... 340/457, 573.1, 667; 180/272
See application file for complete search history.

(56) References Cited

U.S. PATENT DOCUMENTS

| | | | |
|---|---|---|---|
| 6,714,132 B2 * | 3/2004 | Edwards ................ | G08B 21/24 340/457 |
| 6,922,147 B1 | 7/2005 | Viksnins et al. | |
| 8,016,676 B2 | 9/2011 | Carter | |
| 8,058,983 B1 | 11/2011 | Davisson et al. | |
| 8,063,788 B1 * | 11/2011 | Morningstar .......... | G08B 21/22 180/272 |

(Continued)

*Primary Examiner* — John A Tweel, Jr.
(74) *Attorney, Agent, or Firm* — Eugenio J. Torres; Victor Rodriguez; Ferraiuoli LLC

(57) ABSTRACT

A system for alerting a person when a child has been left unattended comprising at least one sensor pad configured to send a first signal to a transmitter which in turn simultaneously relays the first signal to a plurality of receiver modules, wherein said plurality of receiver modules are configured to notify a person that a child has been left unattended if communication between the sensor pad and at least one of the plurality of receiver modules ceases. In addition, a method is provided for alerting a person when a child has been left unattended comprising the steps of sending a first signal, via a sensor pad, to a transmitter; simultaneously relaying the first signal to a plurality of receiver modules; and notifying a person that a child has been left unattended if communication between the sensor pad and at least one of the plurality of receiver modules ceases.

10 Claims, 12 Drawing Sheets

(56) References Cited

U.S. PATENT DOCUMENTS

| | | |
|---|---|---|
| 2003/0122662 A1 | 7/2003 | Quinonez |
| 2003/0160689 A1 | 8/2003 | Yazdgerdi |
| 2005/0030188 A1* | 2/2005 | Flanagan .............. B60R 99/00 340/667 |
| 2006/0019718 A1 | 1/2006 | Kuo |
| 2007/0057799 A1 | 3/2007 | Monzo et al. |
| 2007/0279206 A1 | 12/2007 | Singfield |
| 2008/0073141 A1 | 3/2008 | Jaunarena-Ferrari |
| 2008/0195428 A1 | 8/2008 | O'Sullivan |
| 2009/0091620 A1 | 4/2009 | Anderson |
| 2011/0080288 A1 | 4/2011 | Younse |
| 2012/0024741 A1 | 2/2012 | Beatty et al. |
| 2012/0232749 A1 | 9/2012 | Schoenberg et al. |
| 2012/0235636 A1 | 9/2012 | Partovi |
| 2012/0268265 A1 | 10/2012 | Morley et al. |
| 2013/0049955 A1 | 2/2013 | Hoover et al. |
| 2013/0088057 A1 | 4/2013 | Szakelyhidi et al. |

* cited by examiner

SYSTEM AND METHOD FOR NOTIFYING THE PRESENCE OF AN UNATTENDED CHILD

RELATED APPLICATIONS

This application claims the benefit of U.S. Provisional Application No. 61/903,590 filed on Nov. 13, 2013.

STATEMENT REGARDING FEDERALLY SPONSORED RESEARCH AND DEVELOPMENT

N/A

BACKGROUND OF THE INVENTION

1. Field of the Invention

The present disclosure relates generally to a warning system for detecting the presence of an unattended child occupant left inside a vehicle.

2. Discussion of the Background

The number of infants who perish because they have been left behind in an unattended vehicle is on the rise. In 2013, 44 children died of hyperthermia after being forgotten in a car and many more close calls were documented in the U.S. alone. The deaths usually happened after an otherwise caring and doting parent stepped out of the car, inadvertently leaving the child inside. New technology is needed to address this troubling problem.

There are different systems that tackle this issue. For example, U.S. Pat. No. 8,378,801 describes an invention that features a plurality of sensors connected to a seatbelt in which each sensor determines if the seatbelt is engaged. The present disclosure proposes using a sensor pad as a means to detect if a child is indeed on the car seat. This would avoid the scenario in which a parent or caregiver were to forget the infant even after unbuckling them.

As opposed to prior baby seat occupant detection systems, like U.S. Pat. No. 8,058,983, the present disclosure not only includes a remote unit (a keychain) to alert caregivers that a child has been left in the car, but also takes advantage of smart phone technology by directly pairing the car seat module to the parent's phone via Bluetooth®. The key chain and phone application work independently of each other, so if one fails the other is not affected. The settings on the application are customizable, so that in addition to alerting the user it can also send emails to a specified contact list whenever the alarm is activated. The present disclosure also includes a remote alarm that can alert persons in close proximity to the vehicle of the presence of an unattended child inside the vehicle. A bracelet is also provided for older children that do not require a car seat.

The present disclosure operates using multiple power supply circuits. This provides redundancy in terms of power sources, avoiding any system failure due to the failure of one power supply source.

SUMMARY OF THE DISCLOSURE

It is an objective of the present disclosure to provide a system and method for alerting people when a child has been left unattended in a car.

In one exemplary embodiment of the disclosure multiple presence sensors are located in a Car Seat Module, along with a temperature sensor. A Bracelet Module is also provided to alert caregivers if the infant is in imminent danger. The signals from these sensors are sent to multiple receiver modules independently to alert the caregiver in the event the child is left unattended in the car. The receiver modules are: Keychain, Remote Alarm & Smart Phone. A driver sensor module detects when the caregiver is present in the vehicle and also when the caregiver is no longer present in the vehicle. This sensor communicates with the remote alarm module to alert the caregiver when it detects that the child is left unattended in the vehicle.

It is a further objective of the present disclosure to require simple installation procedures, since it operates with multiple power supply circuits such as car plug connection, rechargeable batteries, piezoelectric materials, photovoltaic cells, or any other easily installed power supply mechanism. Another objective is that any end user can quickly install the system with minimal or no electro-mechanical connection expertise. In addition, the system not only provides redundancy in terms of power sources, but also in terms of alert mechanisms, reducing the possibility of complete system failure.

In another exemplary embodiment of the disclosure at least one sensor pad is configured to send a first signal to a transmitter which in turn simultaneously relays the first signal to a plurality of receiver modules, wherein said plurality of receiver modules are configured to notify a person that a child has been left unattended if communication between the sensor pad and at least one of the plurality of receiver modules ceases.

In another exemplary embodiment of the disclosure a method is provided for alerting a person when a child has been left unattended comprising the steps of sending a first signal, via a sensor pad, to a transmitter; simultaneously relaying the first signal to a plurality of receiver modules; and notifying a person that a child has been left unattended if communication between the sensor pad and at least one of the plurality of receiver modules ceases.

Still other features relating to the aforementioned system and method are contemplated in the present application, as described herein.

DESCRIPTION OF THE PREFERRED EMBODIMENT

Figure 1:
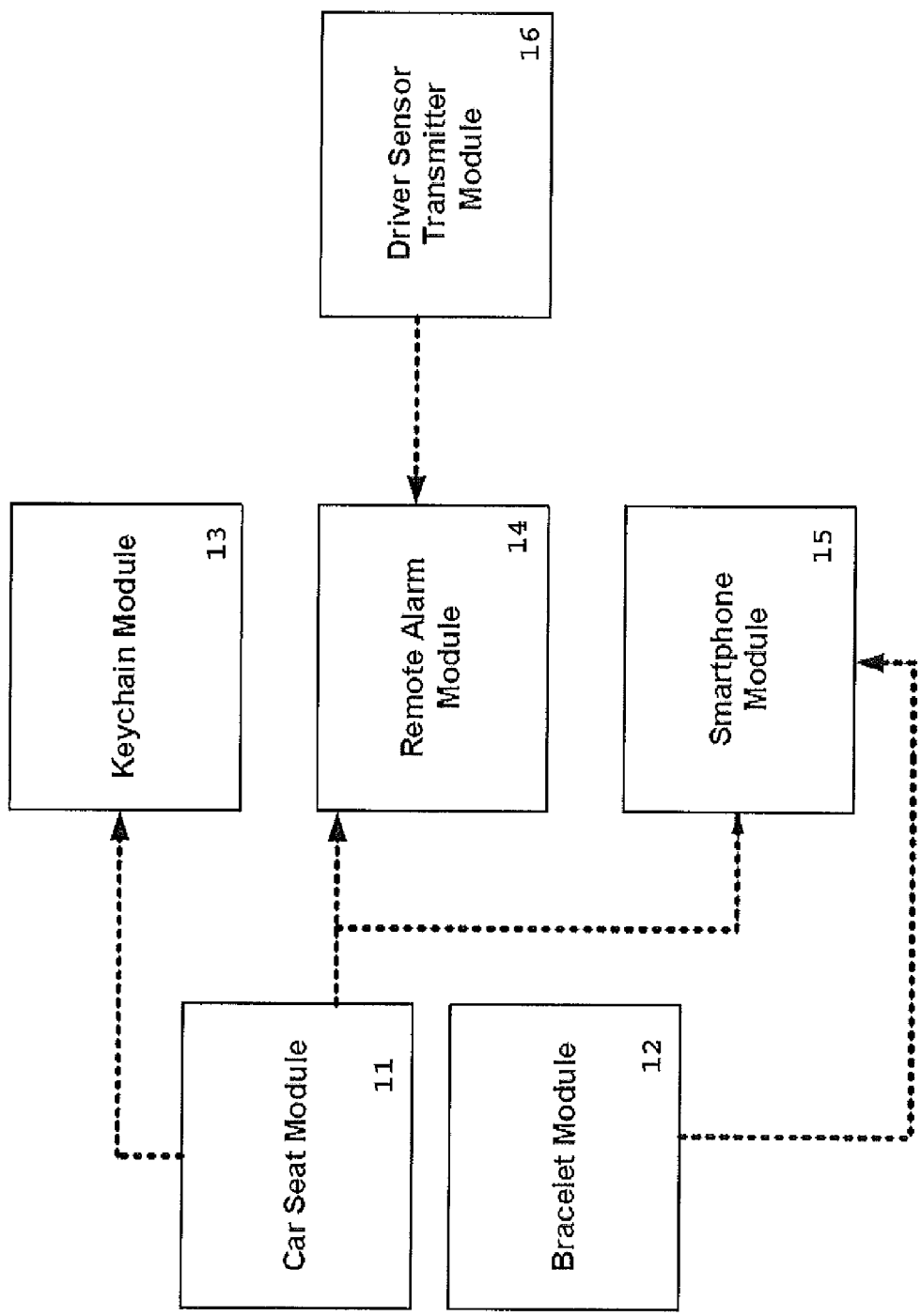
FIG. 1 shows a block diagram of the system.

FIG. 1 shows a general overview of the present disclosure. The disclosure consists of a Car Seat Module and Bracelet Module, which monitor the infant, a Driver Sensor Transmitter Module which monitors the presence of the caregiver within the vehicle, and the Keychain, Remote Alarm and Smart Phone modules, which activate when a child is left unattended in the vehicle, or if the infant is in danger due to high temperatures. The system offers the benefit of being redundant, in terms of the modules that detect the presence of the infant and the modules that notify when there is an emergency situation. There is also redundancy in terms of the power supplies, since most modules have more than one power supply. These redundancies reduce the possibility of a complete system failure.

Figure 2:
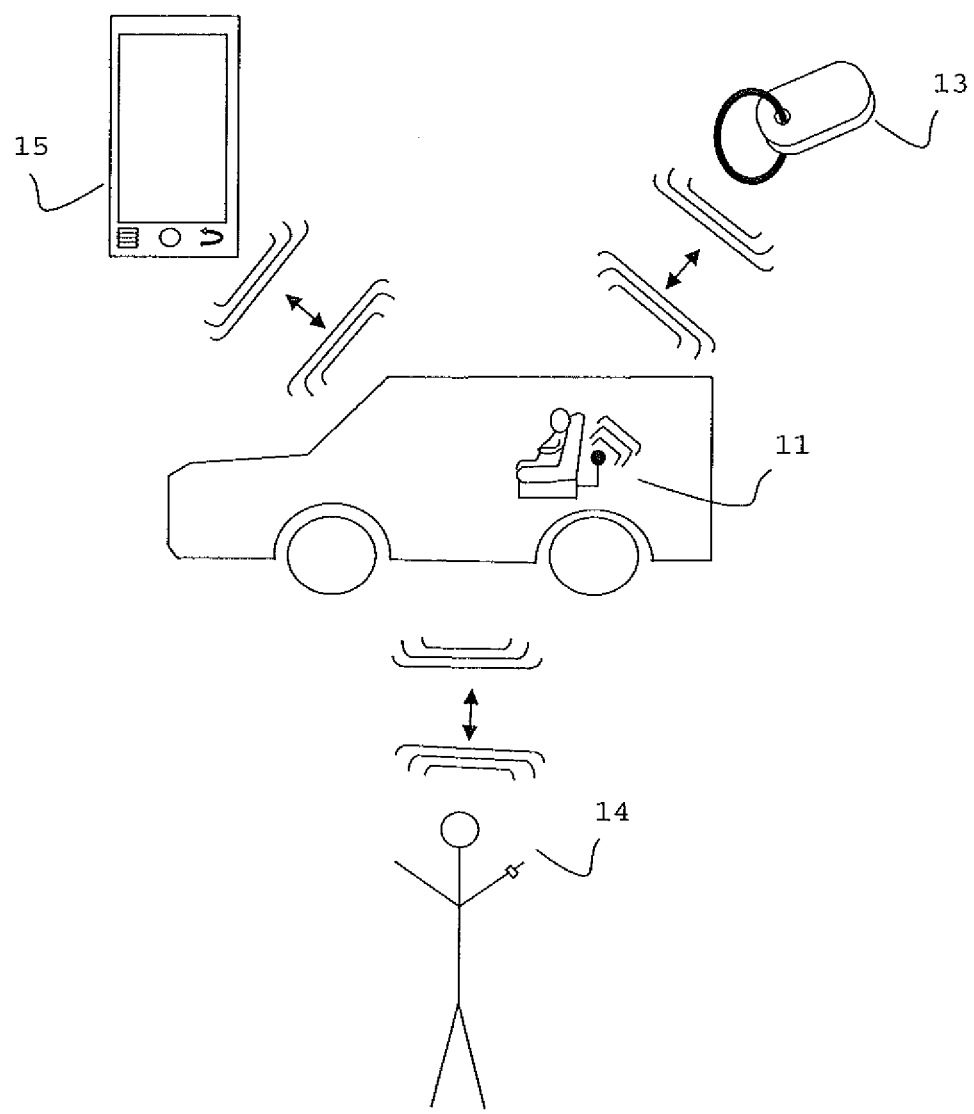
FIG. 2 shows a general overview of the system.

FIG. 2 shows the interaction between the components of a preferred embodiment. According to this preferred embodiment, the disclosure includes a car seat module 11 that works together with a keychain module 13, a remote (passerby) alarm module 14 and a smartphone module 15 to alert caregivers of the presence of an infant in the car after the caregiver has left close proximity of the vehicle. According to said preferred embodiment, there is also a bracelet module 12 (shown in FIG. 8B) which communicates with the smart phone module 15, and a driver sensor module 16 which communicates directly with the remote alarm module 14. The bracelet module is intended to monitor older children that do not require a car seat to travel inside the vehicle.

Figure 3:
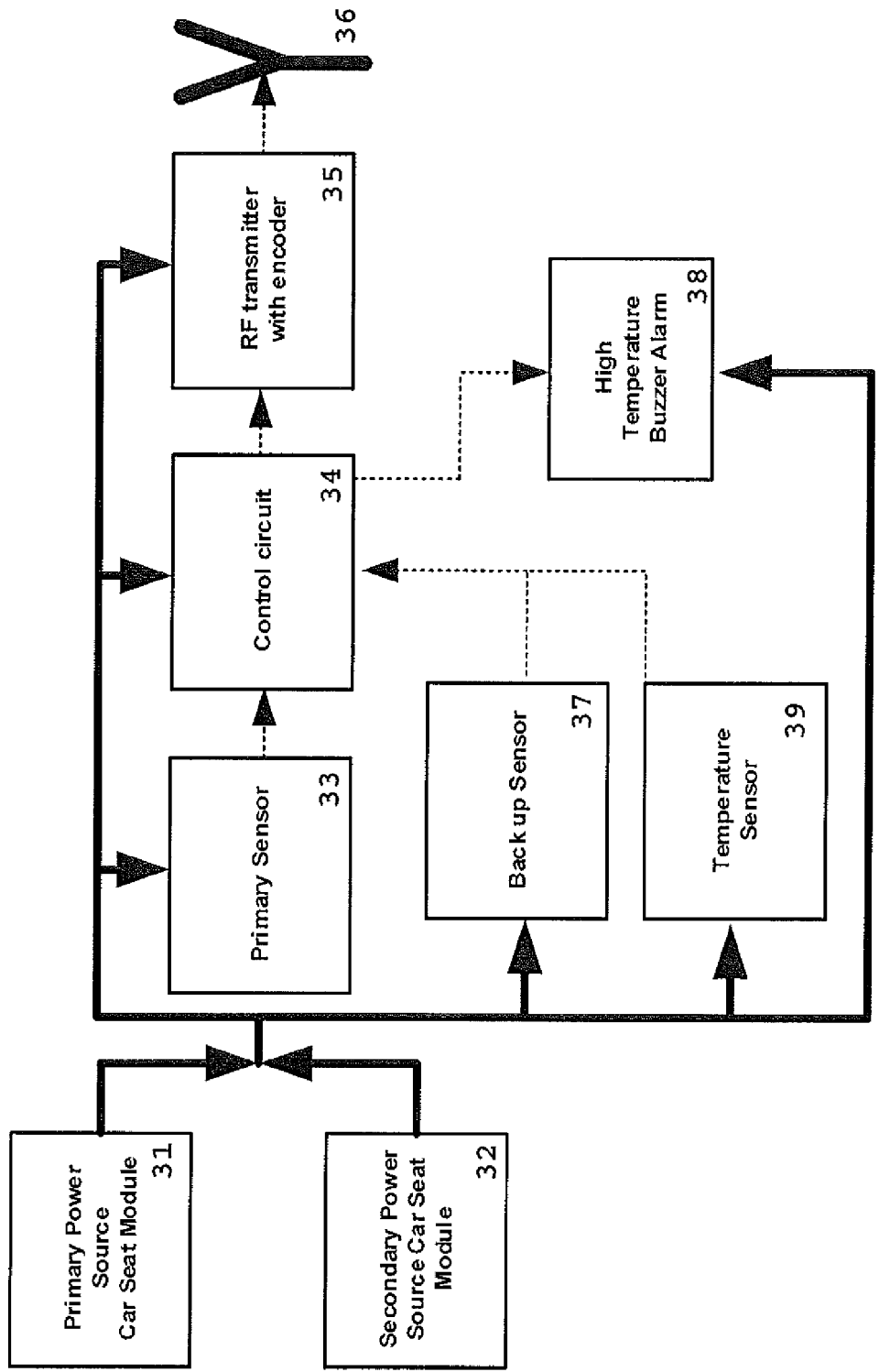
FIG. 3 shows a block diagram of the car seat module.

The car seat module is shown in FIG. 3. A primary sensor pad 33 works as a detection device to alert that the baby is on the car seat. Said embodiment has a backup sensor 37 which detects the presence of the child in case the primary sensor 33 fails. The signal received from the sensor pad 33 is sent through a control circuit 34 to a RF transmitter with encoder 35 system which transmits a "wireless" signal 36 to multiple independent RF receiver modules. The same signal received from the sensor pad will be sent via the Bluetooth 4.0 communication protocol to the smart phone application.

Said embodiment also has a temperature sensor 39 that detects dangerous temperature spikes, in which case it sends a signal to the control circuit 34, which in turn sends a signal to a high temperature buzzer alarm 38 to alert a person that the infant is in imminent danger.

Figure 4:
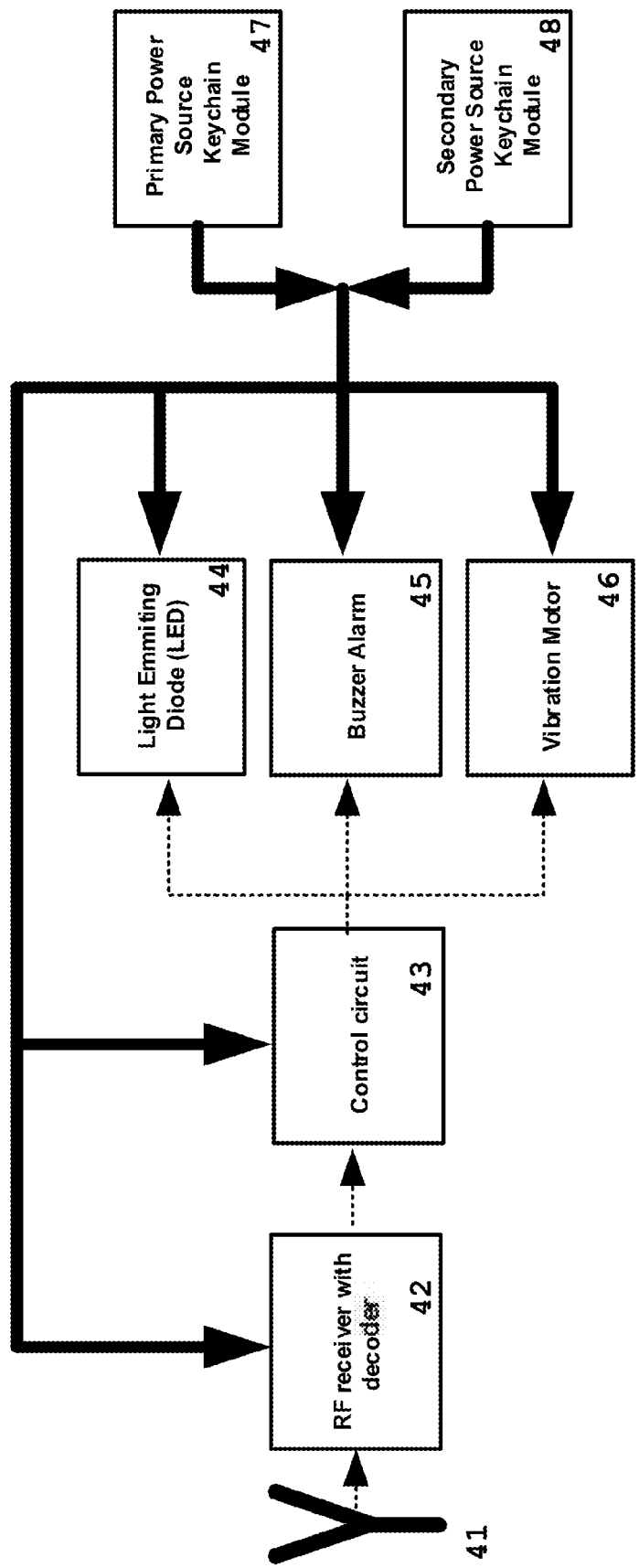
FIG. 4 shows the keychain module.

FIG. 4 shows the key chain module. The signal received from the car seat module 41 is processed via a RF receiver circuit with decoder 42 which is in turn is processed by a control circuit 43 that activates multiple independent alarm signals (e.g., vibration motor, buzzer alarm and a light emitting diode (LED)) (44, 45, 46). The purpose of this keychain module is to alert a user of the keychain, when he or she moves away from the car, that a child is still inside the car. The keychain module provides an alert in case the other alert systems are not working or were ignored. The keychain module works independently from the other modules.

Figure 5A:
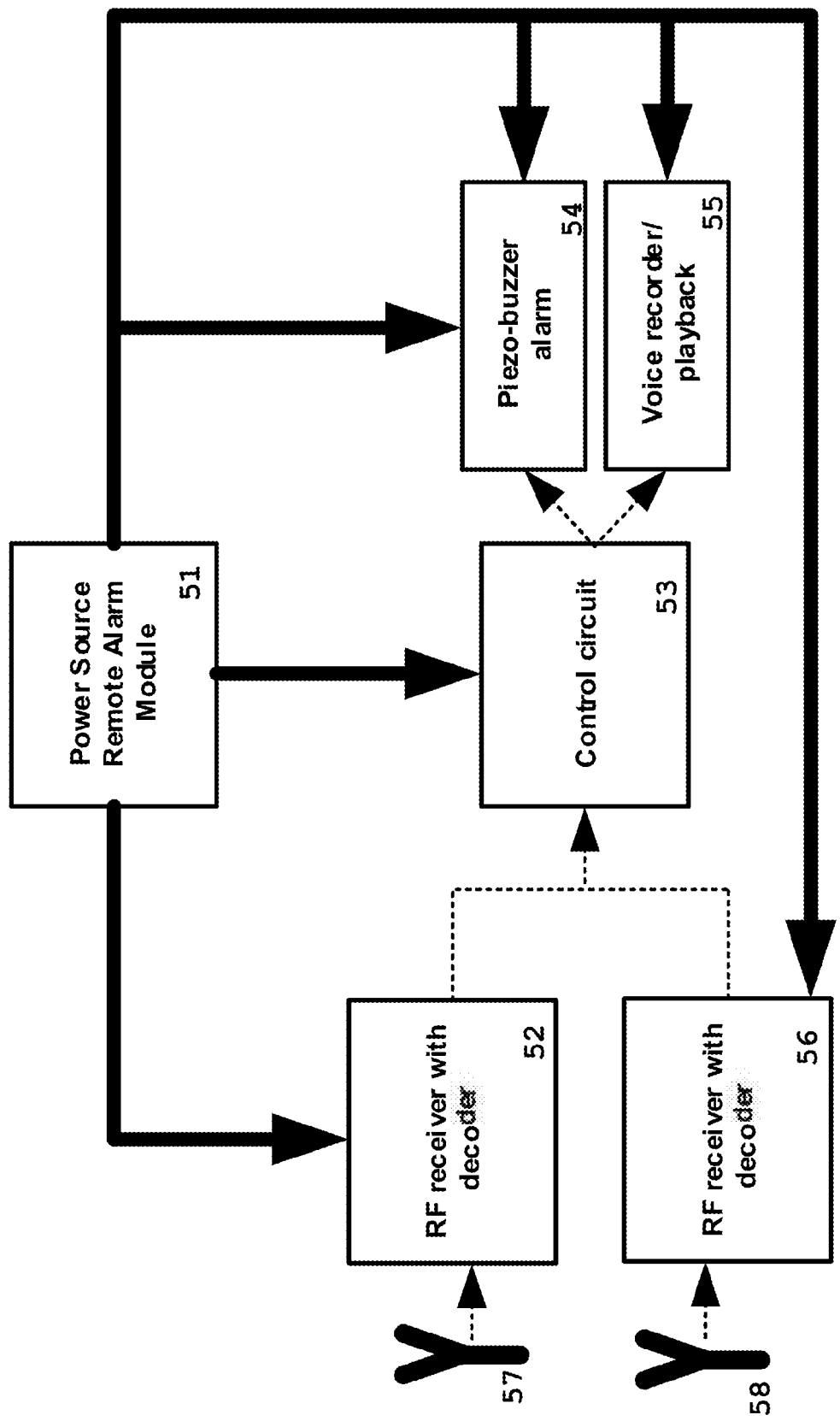
FIG. 5A shows the remote alarm module.

FIG. 5A shows the Remote Alarm module. The signal 57 received from the car seat module will be processed via a RF receiver circuit with decoder 52 which will be used as an input in combination with the input from the signal 58 received from the driver sensor transmitter module, which will also be processed via a RF receiver circuit with decoder 56, located at the driver's seat that will activate an alarm 54 and a message 55 via a control circuit 53 when caregivers step out of the car and do not come back within a pre-determined time span. According to one embodiment, the alarm 54 is a piezo-buzzer alarm, and the message 55 is a pre-recorded voice message.

Figure 5B:
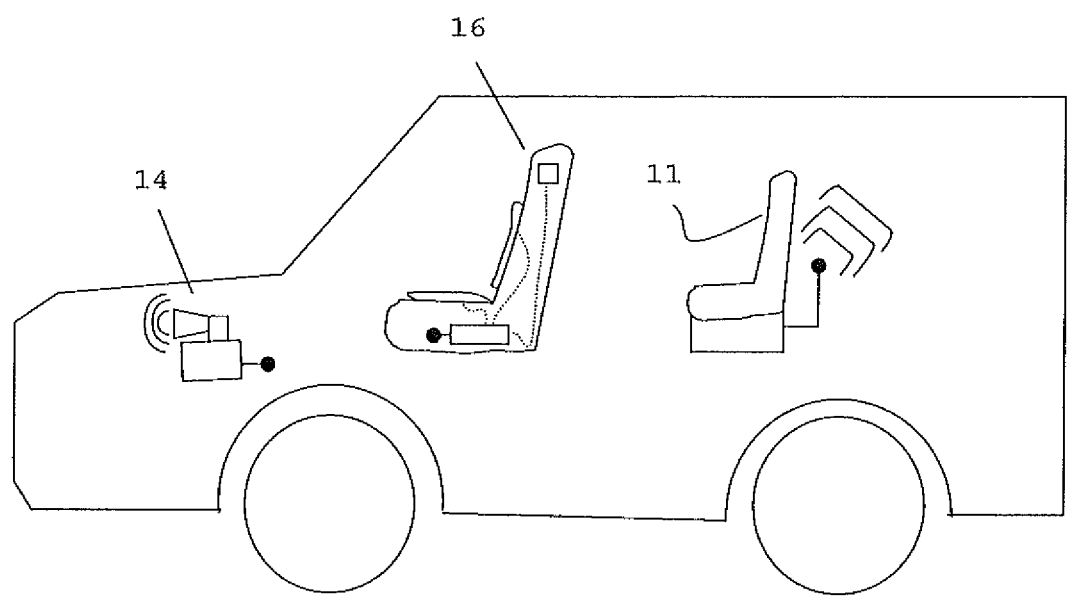
FIG. 5B shows an exemplary embodiment of the remote alarm module.

FIG. 5B shows the interaction between the car seat module 11, the driver sensor module 16 and the remote alarm module 14. According to one embodiment the driver sensor module 16 communicates with the remote alarm module 14 if the presence of a driver is detected. Meanwhile, the car seat module communicates with the remote alarm module if the presence of a child is detected. The remote alarm module will activate when the presence of a child is detected and the presence of a driver is not detected after a predetermined time-span.

Figure 6A:
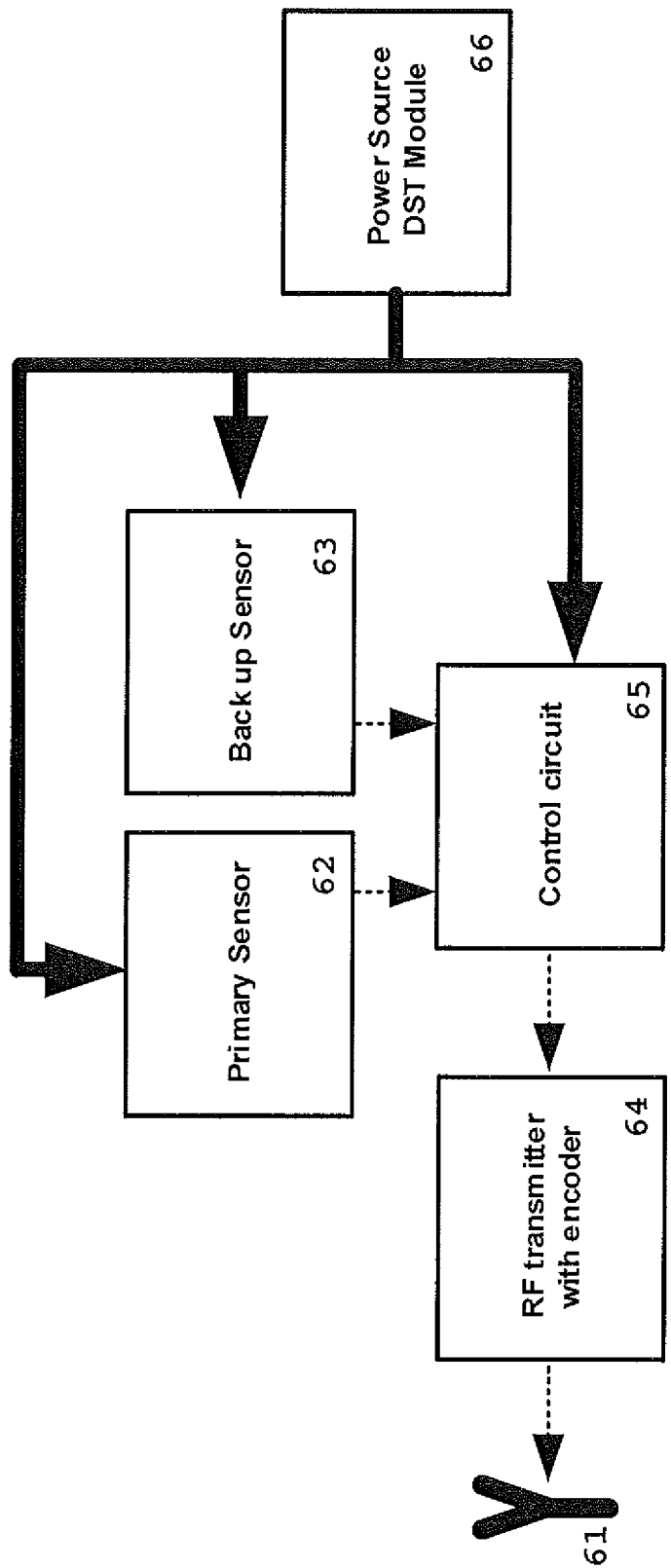
FIG. 6A shows the driver sensor transmitter module.
Figure 6B:
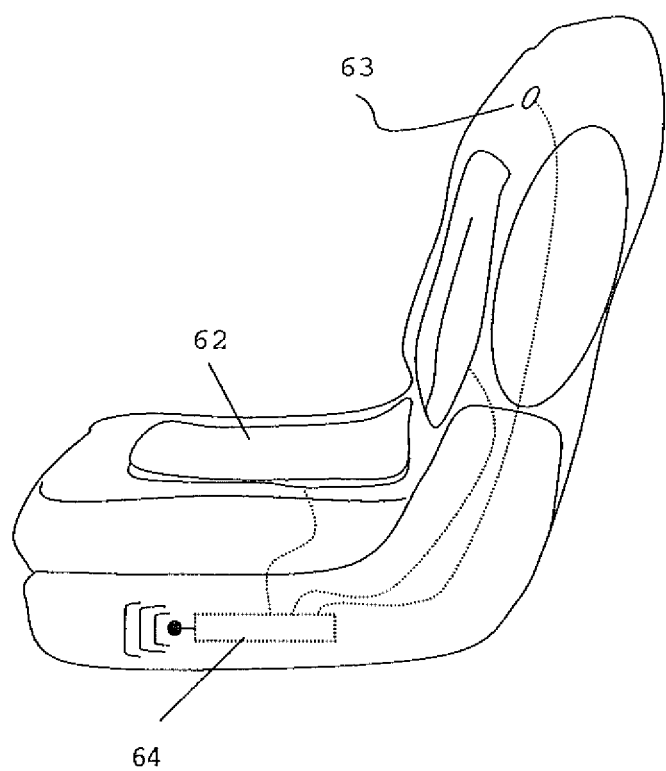
FIG. 6B shows an exemplary embodiment of the driver sensor module.

FIGS. 6A and 6B show the Driver Sensor Transmitter module. A primary sensor 62 detects the presence of the driver within the car. There is also a backup sensor 63 which detects the presence of the driver in the car, in case the primary sensor 62 fails. According to one embodiment, the primary sensor 62 is an electro-mechanical presence pad, and the backup sensor 63 is a three-axis accelerometer which alerts the system if the car has stopped in case the primary sensor fails. The signals received from these sensors (62, 63) are sent through a control circuit 65 to a RF transmitter with encoder 64 system which transmits a "wireless" signal 61 to the Remote Alarm module.

Figure 7:
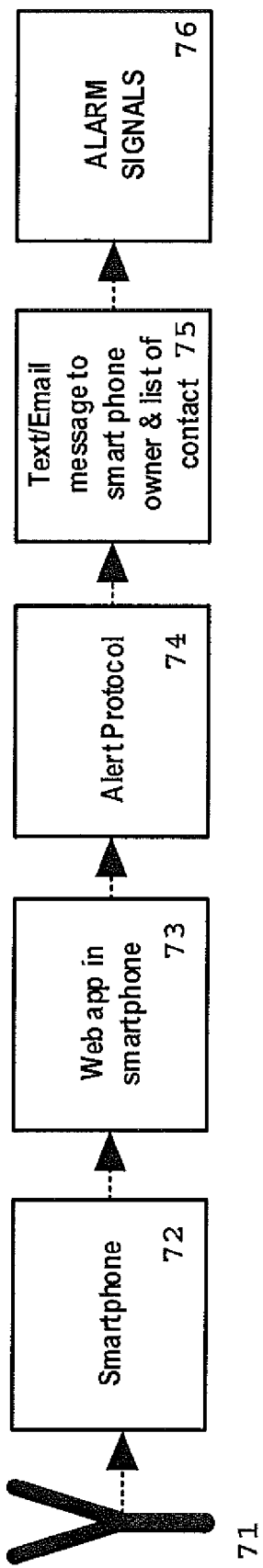
FIG. 7 shows the smart phone module.

FIG. 7 shows the Smart Phone module. The smart phone module consists of a smart phone device that contains a customized application 73 within the device that is in charge of executing the steps shown in FIG. 9. The signal received from the car seat module 71 is processed via the RF receiver (Bluetooth) circuit inside the smart phone device 72. The car seat module and the smart phone are paired via the Bluetooth transmitter. The car seat module utilizes Bluetooth technology so that it can be easily discovered by the smart phone and paired, just as you would pair any other Bluetooth device such as a headset. Once the devices are paired, the user can access the application 73 and monitor the car seat. According to one embodiment, the application provides the ability to customize the alert protocol 74 and provide a list of emergency contacts that are notified via text or e-mail 75. According to another embodiment, the application leverages the use of the accelerometer and GPS device of the smart phone to determine whether the car is moving or not. The purpose of this application is to notify a user that an unattended infant is inside the vehicle when he or she moves away from the car in the event the remaining alert systems are not working or were ignored.

Figure 8A:
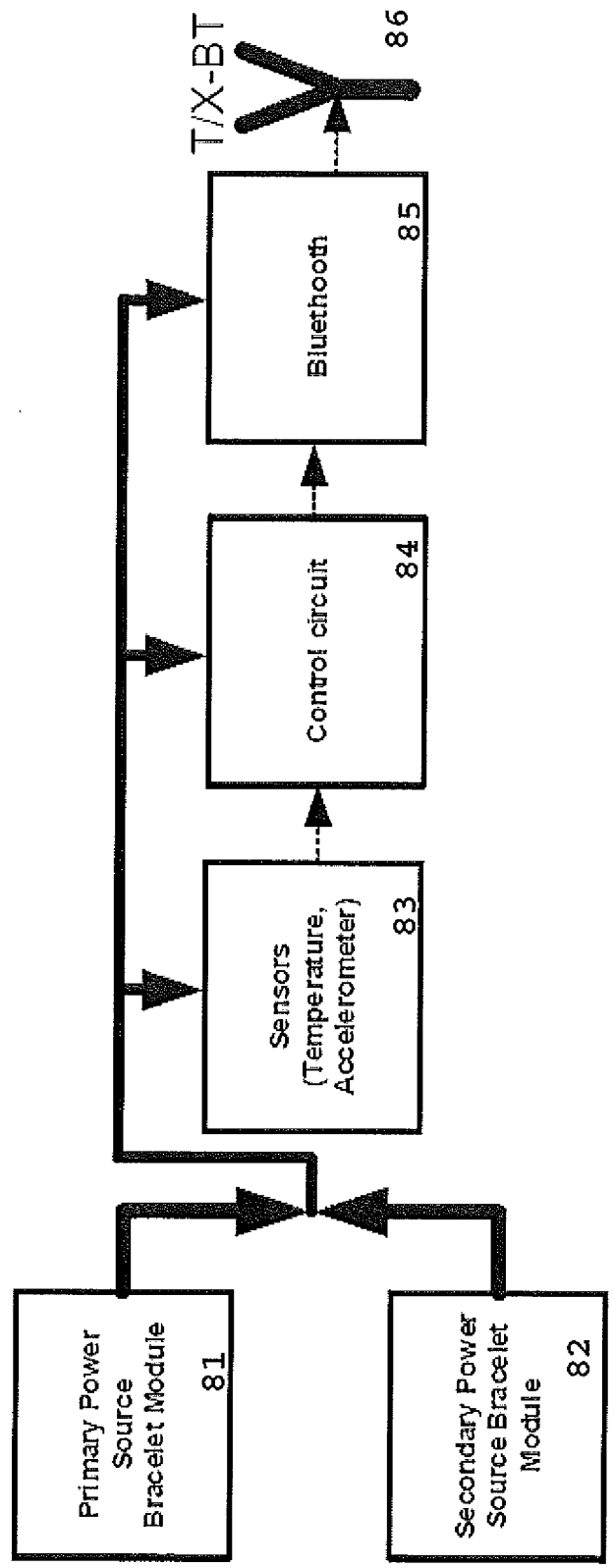
FIG. 8A shows the bracelet module.
Figure 8B:
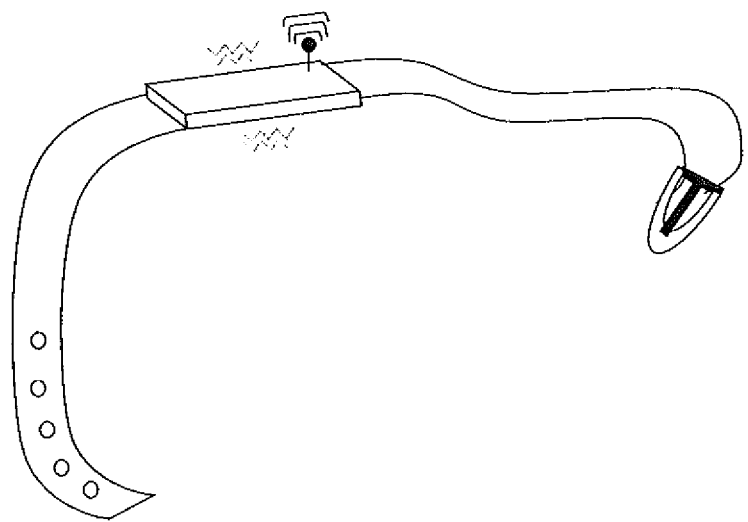
FIG. 8B shows an exemplary embodiment of the bracelet.

FIG. 8A shows the bracelet module. According to one embodiment, the bracelet module will have a Bluetooth device 85 which will communicate with the smart phone application that will be in charge of alerting the status of the child presence inside or outside the vehicle. The bracelet module will transmit its Bluetooth information so that it can be easily discovered by the smart phone and paired. The bracelet contains various sensors 83 to determine if the infant is in danger or if the user of the bracelet steps too far away from the child. These sensors 83 send signals through a control circuit 84 which in turn sends a signal through the Bluetooth 85 which sends a signal 86 to the smart phone. The purpose of the bracelet module is to provide a detection mechanism for children that do not require a car seat. FIG. 8B shows an exemplary embodiment of the bracelet.

Figure 9:
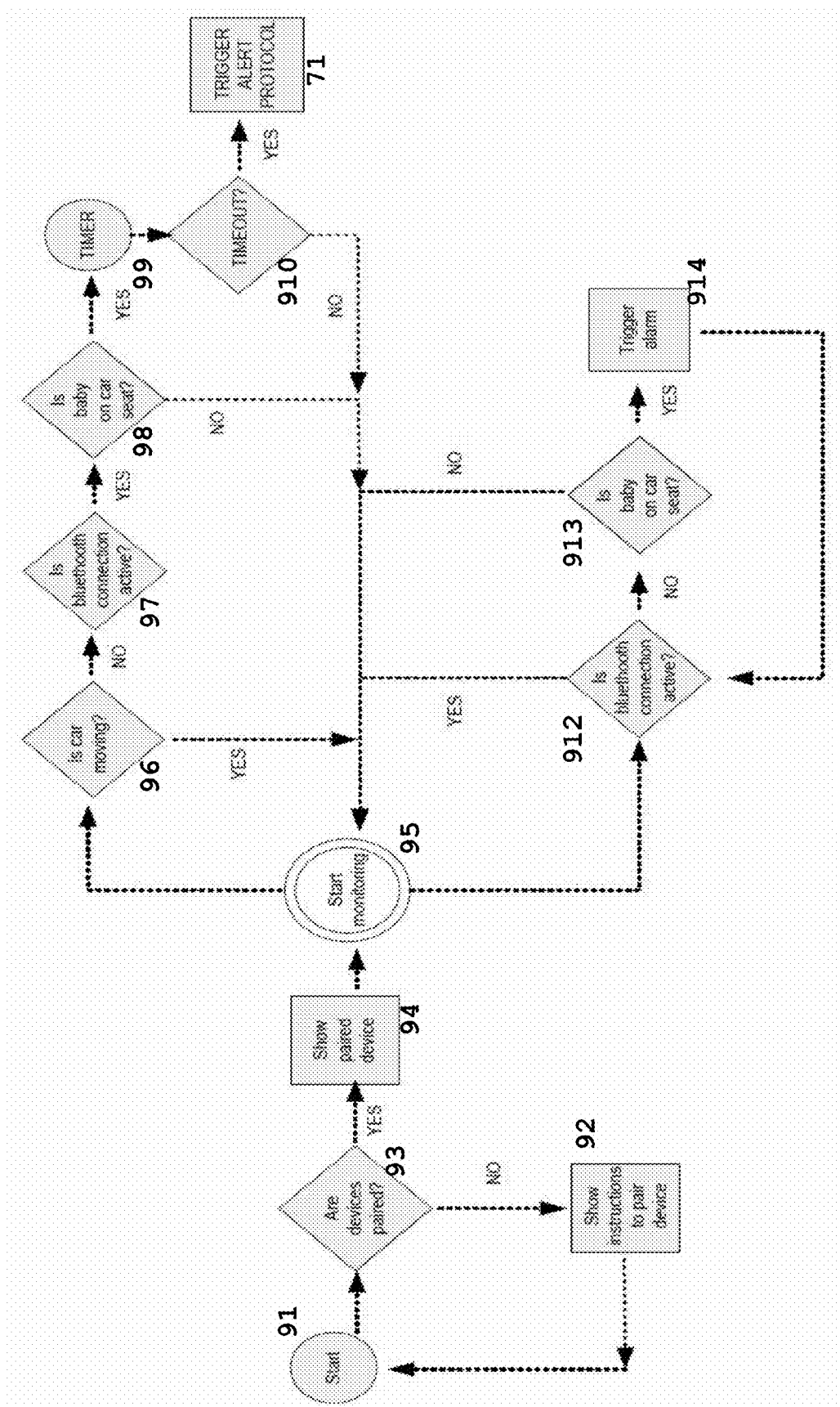
FIG. 9 shows a flowchart which depicts the smart phone application.

FIG. 9 is a flowchart demonstrating the operation of the Smart Phone application. The first step in the application 93 is determining if the smart phone device is paired with the car seat module 11. If they are not paired, the instructions on how to pair the devices appear on the smart phone device as shown in step 92. Once they are paired, the paired device appears on the smart phone device 94, and monitoring begins 95. Two parallel processes run in the application once the devices are paired. One of the processes detects if the car is moving 96; according to one embodiment, the car movements are detected with the smartphone's internal movement sensors. If the car is moving, monitoring continues 95. If on the contrary, the car has stopped, the application verifies that the Bluetooth connection is still active 97, and if it is, it then verifies it the baby is on the car seat 98.

If the baby is not on the car seat, monitoring continues 95. If the baby is on the car seat, a timer commences 99, and if it times out 910 with the baby still on the car seat, the application triggers the alert protocol 71. If on the contrary, the caregiver removes the baby from the car seat while the timer is still running, the application commences monitoring again 95.

The second process runs parallel to the aforementioned one, and verifies that the Bluetooth connection is active. This process is necessary because if the Bluetooth connection fails, the application can no longer verify if the infant is present in the car seat. It begins by verifying if the Bluetooth connection is active 912. If the connection is active, monitoring continues 95. If the connection is not active, the application verifies if the baby is on the car seat 913. If the baby is not on the car seat, the application continues monitoring 95. If on the contrary the baby is still on the car seat, the application triggers the alarm 914.

The system has the benefit of utilizing various power sources, establishing a certain level of redundancy. This reduces the possibility of a module failing due to lack of power. Of the modules which comprise the system, the Car Seat Module, the Keychain Module and the Bracelet Module have two power supplies: a primary power source (31, 47, 81) and a secondary power source (32, 48, 82). These multiple power supplies do not only provide redundancy, but also increase battery uptime. According to one embodiment, one of the power sources may be a rechargeable battery pack and the other may be a photovoltaic cell. According to another embodiment, one of the power sources may be a battery cell, and the other may be a photovoltaic cell. A person having ordinary skill in the art will be able to decide which configuration of power sources will be the best, given system constraints.

The other modules, that is the Driver Sensor Transmitter module and the Remote Alarm module, utilize one power source (51, 66). According to one embodiment, the power sources may be rechargeable battery packs.

According to another embodiment, the disclosure detects the presence of hazardous gases when the infant is still confined within the vehicle.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the forthcoming claims.

What is claimed is:

1. A system for alerting the presence of an unattended child comprising:
   a car seat module comprising a primary sensor configured to send a first signal to a wireless transmitter, the wireless transmitter comprising means for transmitting the first signal as a wireless signal, wherein the first signal is sent if the presence of a person is detected in a car seat;
   a smartphone module comprising a first communication device, and a bracelet module comprising a second communication device, wherein the bracelet module is configured to send a second signal to the smartphone module and wherein the smartphone module is configured to establish a connection between the first communication device and the second communication device, the smartphone module being further configured to receive the first signal and the second signal and to activate an alert protocol within a pre-determined time span if either one of the bracelet module or the car seat module are outside a pre-determined distance,
   a remote alarm module comprising a first buzzer alarm and a pre-recorded message, wherein the first buzzer alarm is activated by the first signal within the pre-determined time span, and
   a keychain module comprising a second buzzer alarm, a vibration motor, and a light emitting diode, wherein the second buzzer alarm, the vibration motor and the light emitting diode are independently activated by the first signal within the pre-determined time span.

2. The system of claim 1 wherein the primary sensor is a sensor pad.

3. The system of claim 1 wherein the primary sensor is a temperature sensor.

4. The system of claim 1 further comprising at least one driver sensor configured to send a third signal to the remote alarm module if the presence of a person is detected in a driver seat.

5. The system of claim 4 wherein the third signal inhibits the first signal from activating the first buzzer alarm and the pre-recorded voice message.

6. The system of claim 1 wherein the alert protocol comprises sending an alert message via e-mail and text message.

7. A system for alerting the presence of an unattended child comprising:
   a plurality of monitoring modules comprising a car seat module, a bracelet module, and a driver sensor transmitter module, wherein the plurality of monitoring modules are configured to detect the presence of a person, wherein the car seat module is configured to send a first presence signal indicating that a child is placed in the car seat module, the bracelet module is configured to send a second presence signal indicating a child is wearing the bracelet module, and the driver sensor transmitter module is configured to send a third presence signal indicating that a person is sitting in a driver seat,
   a plurality of alarm modules comprising a keychain module, a remote alarm module, and a smartphone module, wherein the plurality of alarm modules are configured to alert the presence of an unattended child,
   the smartphone module comprising a first communication device, wherein the smartphone module is configured to establish a connection with the bracelet module, the smartphone module being further configured to receive the first presence signal and the second presence signal and to activate an alert protocol when the presence of an unattended child is detected,
   the remote alarm module comprising a first buzzer alarm and a pre-recorded message, wherein the remote alarm module is configured to receive the first presence signal and the third presence signal and to activate the first buzzer alarm and the pre-recorded message within the pre-determined time span if the first presence signal is received in the absence of the third presence signal, and
   a keychain module comprising a second buzzer alarm, a vibration motor, and a light emitting diode, wherein the keychain module is configured to receive the first presence signal and to independently activate the second buzzer alarm, the vibration motor and the light emitting diode within the pre-determined time span when the presence of an unattended child is detected.

8. A method for alerting the presence of an unattended child in a vehicle comprising:
   a) sending a first signal to a wireless transmitter via a car seat module, wherein the first signal is sent if the presence of a person is detected in a car seat,
   b) the wireless transmitter simultaneously relaying the first signal to a smartphone module, a remote alarm module comprising a first buzzer alarm and a pre-recorded message, and a keychain module comprising a second buzzer alarm, a vibration motor, and a light emitting diode,
c) sending a second signal to the smartphone module via a bracelet module,
d) the smartphone module comprising instructions for executing on a processor the steps of:
   i. establishing a connection with the bracelet module,
   ii. receiving the first signal and the second signal, and
   iii. activating an alert protocol within a pre-determined time span if either one of the bracelet module or the car seat module goes outside a pre-determined distance, and
e) independently activating the first buzzer alarm and the pre-recorded message, the second buzzer alarm, the vibration motor, and the light emitting diode if the car seat module goes outside a pre-determined distance and either one of the remote alarm module and the keychain module goes outside a pre-determined distance.

9. The method of claim 8 further comprising:
a) sending a third signal to the remote alarm module via a driver sensor pad when the presence of a person is detected in the driver sensor pad, and
b) activating the remote alarm module only if the third signal is not received within a pre-determined time span.

10. The method of claim 8 wherein the alert protocol comprises sending an alert message via e-mail and text message.

* * * * *